US009505426B2

(12) United States Patent
Matsuno et al.

(10) Patent No.: US 9,505,426 B2
(45) Date of Patent: Nov. 29, 2016

(54) STEERING COLUMN DEVICE

(71) Applicant: FUJI KIKO Co., Ltd., Kosai-shi, Shizuoka (JP)

(72) Inventors: Mitsuyoshi Matsuno, Shizuoka (JP); Tadao Ito, Shizuoka (JP); Koji Sawamura, Shizuoka (JP)

(73) Assignee: FUJI KIKO Co., Ltd., Kosai-shi (JP)

( * ) Notice: Subject to any disclaimer, the term of this patent is extended or adjusted under 35 U.S.C. 154(b) by 0 days.

(21) Appl. No.: 15/082,011

(22) Filed: Mar. 28, 2016

(65) Prior Publication Data
US 2016/0288818 A1    Oct. 6, 2016

(30) Foreign Application Priority Data

Mar. 31, 2015 (JP) ................. 2015-070657

(51) Int. Cl.
B62D 1/185 (2006.01)
B62D 1/184 (2006.01)
B62D 1/187 (2006.01)

(52) U.S. Cl.
CPC ............. *B62D 1/185* (2013.01); *B62D 1/184* (2013.01); *B62D 1/187* (2013.01)

(58) Field of Classification Search
CPC ....... B62D 1/185; B62D 1/184; B62D 1/187
USPC .......................................... 74/493
See application file for complete search history.

(56) References Cited

U.S. PATENT DOCUMENTS

| | | | |
|---|---|---|---|
| 5,346,255 A | 9/1994 | Schafer et al. | |
| 7,354,069 B2* | 4/2008 | Yamada | B62D 1/184 |
| | | | 280/775 |
| 8,997,600 B2* | 4/2015 | Yamamoto | B62D 1/16 |
| | | | 280/777 |
| 9,283,984 B2* | 3/2016 | Matsuno | B62D 1/187 |
| 2003/0164608 A1 | 9/2003 | Morita et al. | |
| 2009/0066070 A1 | 3/2009 | Ueno et al. | |
| 2010/0294072 A1* | 11/2010 | Ishii | B62D 1/184 |
| | | | 74/493 |
| 2013/0199328 A1* | 8/2013 | Yamamoto | B62D 1/16 |
| | | | 74/493 |
| 2016/0167694 A1* | 6/2016 | Hagiwara | B62D 1/184 |
| | | | 74/493 |

FOREIGN PATENT DOCUMENTS

| | | |
|---|---|---|
| EP | 0564898 A2 | 10/1993 |
| EP | 1245472 A2 | 10/2002 |
| EP | 1910148 B1 | 12/2010 |
| EP | 2716521 A1 | 4/2014 |
| JP | H11-278283 A | 10/1999 |
| JP | 2001-347953 A | 12/2001 |

OTHER PUBLICATIONS

The European search report issued on Sep. 6, 2016 in the counterpart European patent application.

* cited by examiner

*Primary Examiner* — Faye M Fleming
(74) *Attorney, Agent, or Firm* — Mots Law, PLLC

(57) ABSTRACT

A steering column device includes: telescopic guide holes provided in one of a pair of upstanding walls constituting a lower jacket and a pair of vertical walls constituting an upper jacket and also constituted by through-holes opening along a vehicle longitudinal direction; and co-fastening pins penetrating through the telescopic guide holes movably in the telescopic guide holes by which the upstanding walls and the vertical walls are jointly fastened to each other so that the vertical walls can move on the upstanding walls.

4 Claims, 3 Drawing Sheets

STEERING COLUMN DEVICE

CROSS REFERENCE TO RELATED APPLICATION

The present application is based on, and claims priority from Japanese Patent Application No. 2015-070657, filed Mar. 31, 2015, the disclosure of which is hereby incorporated by reference herein in its entirety.

TECHNICAL FIELD

The present application relates to a steering column device capable of a tilt and telescopic operation.

BACKGROUND ART

As conventional examples of the steering column device capable of a tilt and telescopic operation, there are constitutions disclosed in Patent Document 1 (JP 2001-347953 A) and Patent Document 2 (EP 1910148 B1). Each of these steering column devices includes a tilt-position adjustment mechanism for performing positional adjustment of a steering wheel in a vehicle vertical direction and a telescopic-position adjustment mechanism for performing positional adjustment of the steering wheel in a vehicle longitudinal direction.

The steering column device of Patent Document 1 includes an attachment bracket fixed on the side of a vehicle body, an outer column having a cylindrical shape and arranged between a pair of hanging parts constituting the attachment bracket along the vehicle longitudinal direction, an inner column arranged movably in a cylinder of the outer column along the vehicle longitudinal direction, and a fastening member for fixing the inner column and the outer column in arbitrary positions. The outer column is provided with a slit penetrating through a cylinder wall of the outer column Since the fastening member operates to reduce the diameter of the outer column while narrowing the gap of the slit from the outside of the hanging parts in pairs, they are brought into pressure contact with the outer column and then, it is brought into pressure contact with the inner column, thereby fixing the outer column and the inner column to an arbitrary position.

Also in the steering column device of Patent Document 2, similarly to Patent Document 1, since the fastening member narrows the interval of a pair of parallel-upstanding side plates from the outside of a pair of hanging parts, the hanging parts are brought into pressure contact with the outer column and then, it is brought into contact with the inner column, thereby fixing the outer column and the inner column to an arbitrary position.

SUMMARY

In the steering column devices of Patent Documents 1 and 2, commonly, since the fastening member near the slit of the outer column reduces the diameter of the outer column while narrowing the gap of the slit, the outer column and the inner column are fixed at an arbitrary position. In this structure, however, as the outer column and the inner column are strongly fixed in only a slit's portion where the fastening member is arranged, there is a risk that the steering column device could become deteriorated in bending rigidity in the vertical and lateral directions of the whole device.

In consideration of the above-mentioned situation, an object of the present application is to provide a steering column device in which bending rigidity in vertical and lateral directions of the whole device is improved.

A steering column device according to an aspect of the present application includes: a lower jacket including a plate-shaped bottom wall arranged in a horizontal direction and a pair of upstanding walls upstanding in a vertical direction, thereby being formed into an upward U shape; an upper jacket including a pair of vertical walls along the vertical direction and a pair of horizontal walls along the horizontal direction, thereby providing a substantially rect-angular-cylindrical shaped cross section, the upper jacket being arranged movably in the lower jacket along a vehicle longitudinal direction; a distance bracket arranged in the upper jacket to have telescopic slots each constituted by a through-hole which opens along the vehicle longitudinal direction; an operating shaft penetrating through the pair of upstanding walls and the telescopic slots; a lock mechanism disposed on the operating shaft and also configured so as to narrow an interval between the pair of upstanding walls by rotating the operating shaft about an axis thereof in a fastening direction, thereby bringing the lower jacket into pressure contact with the distance bracket; telescopic guide holes provided in either one of the pair of upstanding walls and the pair of vertical walls and also each constituted by a through-hole which opens along the vehicle longitudinal direction; and co-fastening pins provided on the other of the pair of upstanding walls and the pair of vertical walls to penetrate through the telescopic guide holes movably in the telescopic guide holes and also configured to fasten the one of the pair of upstanding walls and the pair of vertical walls so that the vertical walls can move on the upstanding walls.

Since the upstanding walls of the lower jacket are jointly fastened to the vertical walls of the upper jacket by the co-fastening pins respectively, the upper jacket can be held on the lower jacket in two places: one contact portion where the lower jacket comes in contact with the distance bracket by the operating shaft and the lock mechanism; and another contact portion where the upstanding wall of the lower jacket comes into contact with the vertical wall of the upper jacket. For this reason, the steering column device is improved in terms of bending rigidity in vertical and lateral directions of the whole device. Furthermore, as the characteristic frequency of the steering column device is elevated, it becomes advantageous to vibrations.

Preferably, the steering column device further includes an attachment bracket including an attachment body arranged in the horizontal direction and a pair of hanging parts hanging from the attachment body, thereby being formed into a downward U shape. Then, it is preferable that the lower jacket is pivotally supported by the attachment bracket, whereby the lower jacket and the attachment bracket form a box-shaped cross section.

Since the arrangement where the upward U-shaped lower jacket supports the downward U-shaped attachment bracket provides a box-shaped cross section composed of the attachment bracket and the lower jacket, the steering column device is improved in terms of bending rigidity in vertical and lateral directions of the whole device. Again, as the characteristic frequency of the steering column device is elevated, it becomes advantageous to vibrations.

It is preferable that the upper jacket includes slide contact pieces arranged in front of respective front ends of the vertical walls and extended so as to be slidable on respective inner faces of the upstanding walls. Preferably, each of the sliding contact pieces is constituted by an elastic piece, the sliding contact pieces protruding toward the inner faces of the upstanding walls. Also preferably, the sliding contact pieces and the upstanding walls are jointly fastened to each other by the co-fastening pins.

With the structure where the slide contact pieces are jointly fastened to the upstanding walls while making the slide contact pieces abut against the inner face of the upstanding walls slidably, it is possible to further suppress shaking or rattling of the front-end portion of the jacket body due to elastic force of the slide contact pieces.

It is preferable that the attachment bracket further includes clamp parts extended from respective rear ends of the hanging parts rearward. Also preferably, the clamp parts have their respective upper edges separated from the attachment body.

As the bending rigidity of the clamp parts is lowered to equalize rigidity by separating the upper edges of the clamp parts from the attachment body, it is possible to eliminate the dispersion in the operating force in locking or unlocking at the tilt position.

DESCRIPTION OF EMBODIMENTS

Figure 1:
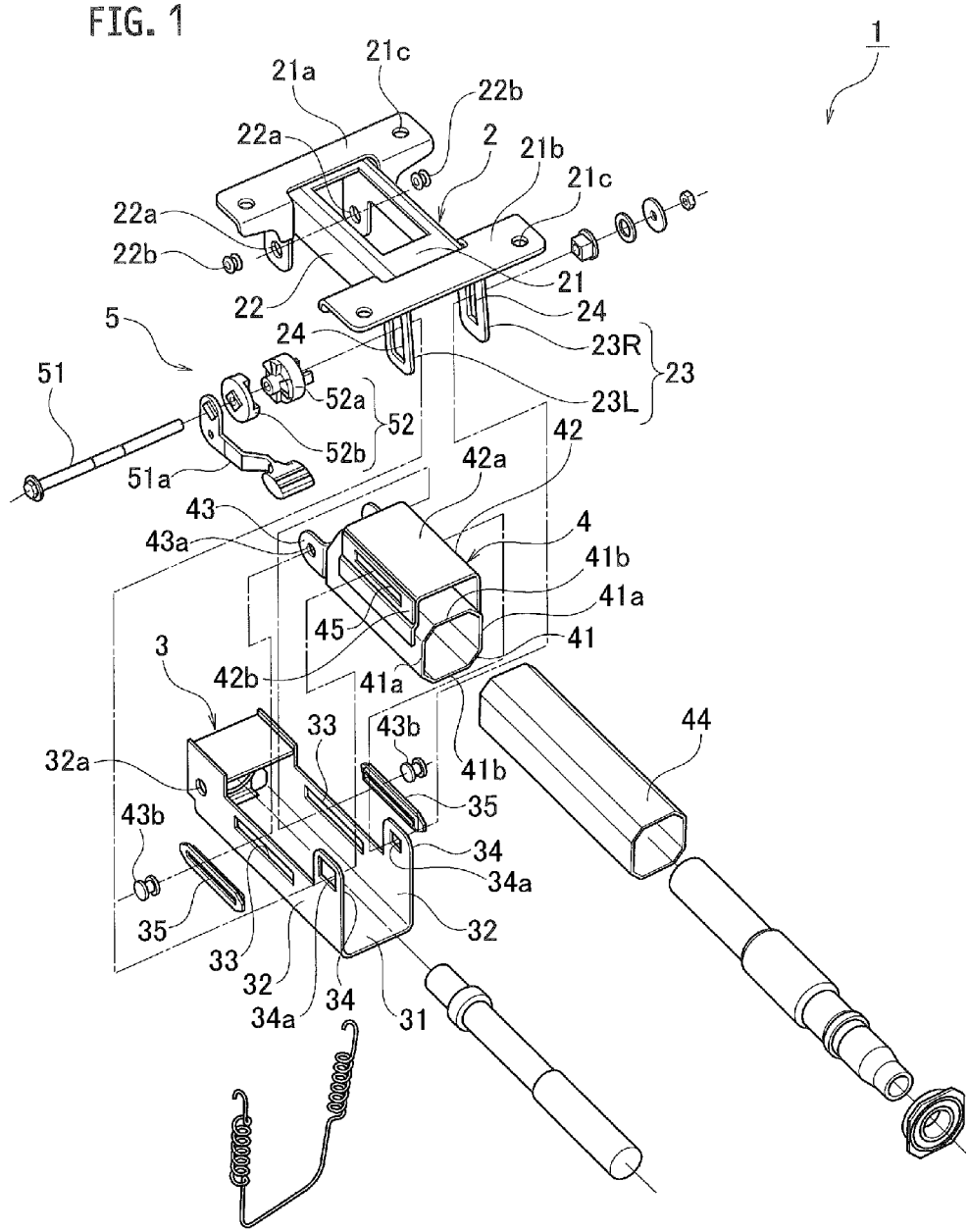
FIG. 1 is an exploded perspective view of a steering column device according to an embodiment.
Figure 2:
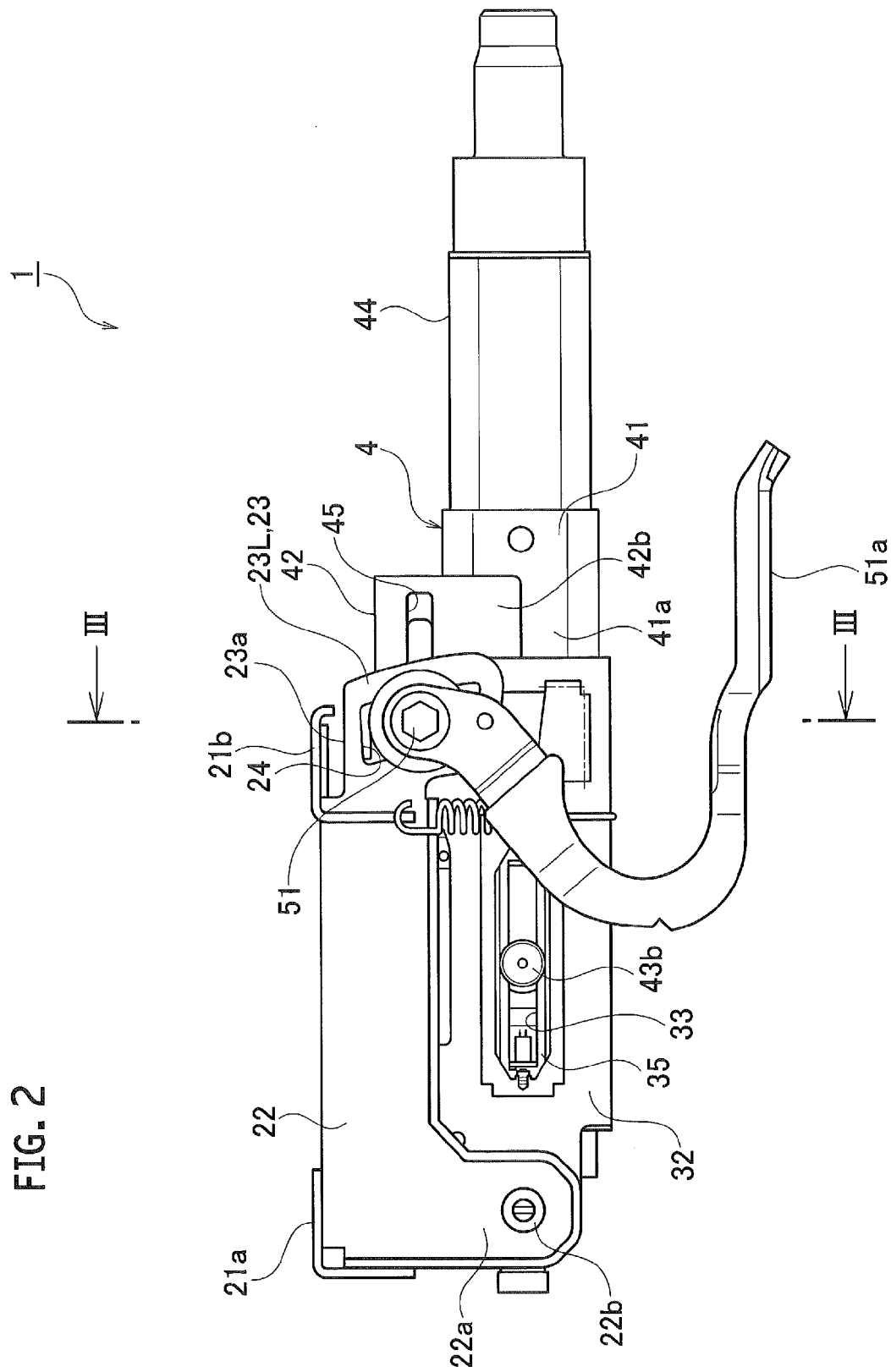
FIG. 2 is a side view of the steering column device according to the embodiment.
Figure 3:
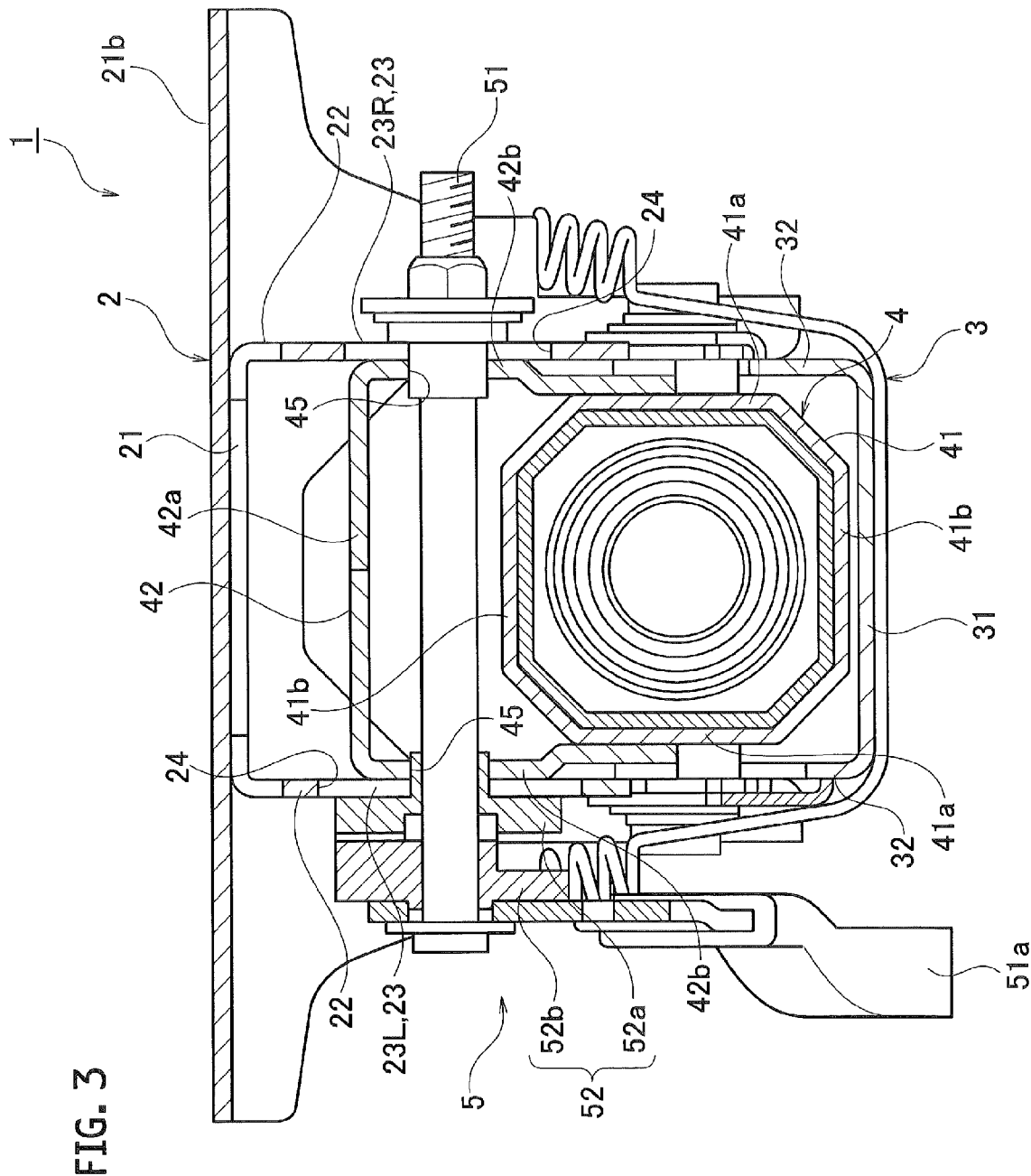
FIG. 3 is a sectional view along a line III-III of FIG. 2.

An embodiment will be described with reference to the drawings. As illustrated in FIGS. 1 to 3, a steering column device 1 according to the embodiment is a manual type steering column device. The steering column device 1 according to the embodiment includes an attachment bracket 2 for fixing the column device 1 to a vehicle body, a lower jacket 3 which is supported to the attachment bracket 2 so as to be swingable (capable of adjusting its tilt position) in a vehicle vertical direction, an upper jacket 4 which is supported to the lower jacket 3 so as to be movable (capable of adjusting its telescopic position) in a vehicle longitudinal direction, and a lock mechanism 5 which fastens the attachment bracket 2, the lower jacket 3, and the upper jacket 4 integrally.

The attachment bracket 2 includes a plate-shaped attachment body 21 arranged along a horizontal direction and a pair of hanging parts 22 hanging from left and right marginal parts of the attachment body 21, and is formed into a downward U shape.

The attachment body 21 includes a front-side fixing part 21a and a rear-side fixing part 2 1b which are arranged on front and rear sides of the vehicle in the vehicle longitudinal direction so as to overlie the top face of the attachment body 21 and extend in a vehicle width direction, respectively. In the front-side fixing part 21a and the right-side fixing part 21b, fixing holes 21c are opened in respective left and right end portions.

The pair of hanging parts 22 are provided, at their front end portions, with pivot parts 22a which are constituted by though-holes to support the lower jacket 3 pivotably. The pair of hanging parts 22 are also provided, at their rear end portions, with clamp parts 23 (23R, 23L) which are constituted by vertical walls extending rearward.

The clamp parts 23 are constituted by elastic pieces. Since the clamp parts 23, which are extended rearward of the hanging parts 22, have their upper edges separated from the attachment body 21, attachment slits are defined between the upper edges and the attachment body 21. In each clamp part 23, there is opened a tilt slot 24 which is constituted by a circular elongated hole centering on the pivot part 22a to define a tilt-position adjustment range.

The lower jacket 3 includes a plate-shaped bottom wall 31 arranged in the horizontal direction and a pair of upstanding walls 32 standing from left and right edges of the bottom wall 31 in the vertical direction, and is formed into an upward U shape by the pair of upstanding walls 32 and the bottom wall 31.

Each of upstanding walls 32 includes a pivot receiving part 32a in a front end portion, a telescopic guide hole 33 in an intermediate portion, and a fastening piece 34 in a rear end portion.

Each pivot receiving part 32a is constituted by a through-hole which is pivotably supported to the pivot part 22a through a pivot pin 22b respectively.

Each telescopic guide hole 33 opens in parallel with a telescopic slot 45 to allow an insertion of a co-fastening pin 43b thereinto. A slide guide 53 is inserted and fitted to each telescopic guide hole 33 from the side of its external face.

Each of slide guides 35 is made from a frame-shaped resin material and also provided to reduce frictional resistance when a slide contact piece 43 slides on the inner face of the upstanding wall 32 of the lower jacket 3.

Each fastening piece 34 is constituted by an elastic piece which extends from the upper edge of a rear end portion of the upstanding wall 32 upwardly. Each fastening piece 34 is provided, in its middle portion, with an operating-shaft hole 34a which opens in the form of a rectangular hole. Additionally, since the downward U-shaped attachment bracket 2 is supported by the upward U-shaped lower jacket 3, the resultant assembly has a substantially box-shaped cross section.

The upper jacket 4 includes a jacket body 41, a distance bracket 42, the slide contact pieces 43, and an inner jacket 44.

The jacket body 41 includes a pair of vertical walls 41a along the vertical direction and a pair of horizontal walls 41b along the horizontal direction, thereby providing a substantially rectangular-cylindrical shaped cross section.

The distance bracket 42 includes a plate-shaped distance body 42a arranged in the horizontal direction and a pair of distance vertical walls 42b hanging from left and right marginal parts of the distance body 42a. The distance bracket 42 is formed into a downward U shape by the distance body 42a and the pair of distance vertical 42b. The distance bracket 42 is arranged on the top part of the jacket body 41, and respective lower edges of the distance vertical walls 42b are fixed to the vertical walls 41a of the jacket body 41 by welding or the like. In each of the distance vertical walls 42b, there is opened the telescopic slot 45 which allows an insertion of the operating shaft 51 thereinto and which is constituted by an elongated hole extending along the vehicle longitudinal direction, thereby defining the telescopic-position adjustment range.

Each of the slide contact pieces 43 is constituted by an elastic piece extending forward from the front end of the jacket body 41. Under condition of assembling the upper jacket 4 into the lower jacket 3, each of the slide contact pieces 43 is urged against the slide guide 35, which protrudes on the inner face of the upstanding wall 32 of the lower jacket 3, by elastic force of the piece 43, and held by the slide guide 35 slidably on its inner face. Each of the slide contact pieces 43 includes the co-fastening hole 43a formed by a through-hole. The co-fastening hole 43a is adapted so as to overlap and communicate with the telescopic guide hole 33 of the lower jacket 3 under condition that the upper jacket 4 is disposed in the lower jacket 3. By inserting the co-fastening pins 43b into the co-fastening holes 43a and the telescopic guide holes 33, which communicate with each other, and also the slide guides 35, and subsequently crimping the inserted co-fastening pins 43b, an appropriate clearance is defined between the upper jacket 4 and the lower jacket 3. As a result, the upper jacket 4 can move in the lower jacket 3 without causing looseness.

The inner jacket 44 has a substantially rectangular-cylindrical shaped cross section similar to that of the jacket body 41. The inner jacket 44 is secured in the cylinder of the jacket body 41 by press-fitting, welding, or the like.

The lock mechanism 5 includes an operating shaft 51 and a cam mechanism 52. The cam mechanism 52 includes a stationary cam 52a and a rotational cam 52b.

The operating shaft 51 having a shaft-shape penetrates through the tilt slots 24 of both hanging parts 22, the operating-shaft holes 34a of the fastening pieces 34, and the telescopic slots 45 of the distance bracket 42 along the vehicle width direction, and is supported rotatably around an axis of the shaft. One end (on one-end side) of the operating shaft 51 is supported by the right-side clamp part 23R, while the other end (on another-end side) of the operating shaft 51 protrudes from the outer face of the left-side clamp part 23L. An operating lever 51a is disposed on the protruding portion of the operating shaft 51. The stationary cam 52a and the rotational cam 52b are disposed on a portion of the operating shaft 51, which is located between the operating lever 51a and the left-side clamp part 23L.

The stationary cam 52a is formed with a wide circular shape whose center is penetrated by the operating shaft 51, and also arranged so that its stationary cam face faces the side of the operating lever 51a. With the back side of the stationary cam face fitted into the tilt slot 24, additionally, the stationary cam 52a is arranged so as not to rotate around the operating shaft 51 but to be movable in the tilt slot 24 vertically. On the stationary cam face of the stationary cam 52a, crest parts and trough parts are formed in the circumferential direction alternately.

The rotational cam 52b is formed with a wide circular shape whose center is penetrated by the operating shaft 51, and also arranged so that its rotational cam face faces the stationary cam face of the stationary cam 52a. The rotational cam 52b is assembled to the operating shaft 51 so as to rotate together with the operating shaft 51 penetrating through the rotational cam 52b, around the axis. On the rotational cam face of the rotational cam 52b, crest parts and trough parts are formed in the circumferential direction alternately.

Next, the operating sequence of the steering column device 1 according to the embodiment will be described.

In order to fix the upper jacket 4 in a desired position, it is firstly performed to move the upper jacket 4 in both the tilt direction (vehicle vertical direction) and the telescopic direction (vehicle longitudinal direction) for the desired position while cancelling the fastening state between the upper jacket 4 and the lower jacket 3. Then, the operating lever 51a is swingably operated upward. With the operating lever 51a swingably operated upward, the operating shaft 51 is rotated about the axis in the fastening direction.

With the rotation of the operating shaft 51 to the fastening direction, the crest parts of the stationary cam 52a and the crest parts of the rotational cam 52b overlap each other, so that the axial dimension of the cam mechanism 52 is expanded. Consequently, the operating shaft 51 is fastened to bring the clamp parts 23, the fastening pieces 34 and the distance bracket 42 into pressure contact with each other and therefore, the lower jacket 3 is held at an arbitrary position.

In order to adjust the position of the upper jacket 4, the fastening state between the upper jacket 4 and the lower jacket 3 is cancelled. For this purpose, it is first performed to swingably operate the operating lever 51a downward. With the downward swinging of the operating lever 51 a, the operating shaft 51 is rotated about its axis in the direction to cancel the fastening state.

With the rotation of the operating shaft 51 in the direction to cancel the fastening state, the crest parts of the stationary cam 52a and the trough parts of the rotational cam 52b overlap each other, so that the axial dimension of the cam mechanism 52 is narrowed. Consequently, the operating shaft 51 is loosened to cancel the pressure contact among the clamp parts 23, the fastening pieces 34, and the distance bracket 42, so that the lower jacket 3 becomes possible to move to the attachment bracket 2 in the tilt direction (vehicle vertical direction) and additionally, the upper jacket 4 becomes possible to move in the telescopic direction (vehicle longitudinal direction).

With the steering column device 1 according to the embodiment, the upstanding walls 32 of the lower jacket 3 are jointly fastened to the vertical walls 41a of the upper jacket 4 by the co-fastening pins 43b, respectively. Thus, the upper jacket 4 can be held on the lower jacket 3 in two places: one contact portion where the lower jacket 3 comes in contact with the distance bracket 42 by the operating shaft 51 and the lock mechanism 5; and another contact portion where the upstanding wall 32 of the lower jacket 3 comes into contact with the vertical wall 41a of the upper jacket 4. For this reason, the steering column device 1 is improved in terms of bending rigidity in vertical and lateral directions of the whole device. Furthermore, as the characteristic frequency of the steering column device 1 is elevated, it becomes advantageous to vibrations.

Additionally, since the arrangement where the upward U-shaped lower jacket 3 supports the downward U-shaped attachment bracket 2 provides a box-shaped cross section composed of the attachment bracket 2 and the lower jacket 3, the steering column device 1 is improved in terms of bending rigidity in vertical and lateral directions of the whole device. Again, as the characteristic frequency of the steering column device 1 is elevated, it becomes advantageous to vibrations.

With the structure where the slide contact pieces 43 are jointly fastened to the upstanding walls 32 while making the slide contact pieces 43 abut against the inner face of the upstanding walls 32 slidably, it is possible to suppress shaking or rattling of the front-end portion of the jacket body 41 due to elastic force of the slide contact pieces 43.

Additionally, as the bending rigidity of the clamp parts 23 is lowered to equalize rigidity by separating the upper edges of the clamp parts 23 from the attachment body 21, it is possible to eliminate the dispersion in the operating force in locking or unlocking at the tilt position.

What is claimed is:
1. A steering column device, comprising:
a lower jacket including a plate-shaped bottom wall arranged in a horizontal direction and a pair of upstanding walls upstanding in a vertical direction, thereby being formed into an upward U shape;
an upper jacket including a pair of vertical walls along the vertical direction and a pair of horizontal walls along the horizontal direction, thereby providing a substantially rectangular-cylindrical shaped cross section, the upper jacket being arranged movably in the lower jacket along a vehicle longitudinal direction;

a distance bracket arranged in the upper jacket to have telescopic slots each constituted by a through-hole which opens along the vehicle longitudinal direction;

an operating shaft penetrating through the pair of upstanding walls and the telescopic slots;

a lock mechanism disposed on the operating shaft and also configured so as to narrow an interval between the pair of upstanding walls by rotating the operating shaft about an axis thereof in a fastening direction, thereby bringing the lower jacket into pressure contact with the distance bracket;

telescopic guide holes provided in either one of the pair of upstanding walls and the pair of vertical walls and also each constituted by a through-hole which opens along the vehicle longitudinal direction; and co-fastening pins provided on the other of the pair of upstanding walls and the pair of vertical walls to penetrate through the telescopic guide holes movably in the telescopic guide holes and also configured to fasten the one of the pair of upstanding walls and the pair of vertical walls so that the vertical walls can move on the upstanding walls.

2. The steering column device of claim 1, further comprising an attachment bracket including an attachment body arranged in the horizontal direction and a pair of hanging parts hanging from the attachment body, thereby being formed into a downward U shape, wherein the lower jacket is pivotally supported by the attachment bracket, whereby the lower jacket and the attachment bracket form a box-shaped cross section.

3. The steering column device of claim 2, wherein the upper jacket includes slide contact pieces arranged in front of respective front ends of the vertical walls and extended so as to be slidable on respective inner faces of the upstanding walls, each of the sliding contact pieces is constituted by an elastic piece, the sliding contact pieces protruding toward the inner faces of the upstanding walls, and the sliding contact pieces and the upstanding walls are jointly fastened to each other by the co-fastening pins.

4. The steering column device of claim 2, wherein the attachment bracket further includes clamp parts extended from respective rear ends of the hanging parts rearward, and the clamp parts have their respective upper edges separated from the attachment body.

* * * * *